United States Patent [19]

Chu

[11] Patent Number: 5,142,564
[45] Date of Patent: Aug. 25, 1992

[54] MODULAR TELEPHONE ANSWERING MACHINE

[76] Inventor: Chi Wai Chu, 2-88 Ma Ling Path, House No. 28, Windsor Park, Kau Tau Shan Shatin, N. T., Hong Kong

[21] Appl. No.: 550,966

[22] Filed: Jul. 11, 1990

[51] Int. Cl.$^5$ ............................................. H04M 1/64
[52] U.S. Cl. ........................................ 379/67; 379/88; 379/73; 379/74
[58] Field of Search ................ 379/67, 88, 73, 74, 379/75, 77, 61, 62

[56] References Cited

U.S. PATENT DOCUMENTS

| | | | |
|---|---|---|---|
| 3,953,680 | 4/1976 | Zimmermann | 379/77 |
| 4,049,915 | 9/1977 | Danner. | |
| 4,356,509 | 10/1982 | Skerlos et al. | |
| 4,427,847 | 1/1984 | Hofmann et al. | |
| 4,456,925 | 6/1984 | Skerlos et al. | |
| 4,469,919 | 9/1984 | Nakamura et al. | |
| 4,514,593 | 4/1985 | Hattori et al. | 379/74 |
| 4,658,097 | 4/1987 | D'Agosto, III et al. | |
| 4,677,658 | 6/1987 | Kolodny et al. | |
| 4,719,647 | 1/1988 | Theis et al. | |
| 4,794,638 | 12/1988 | Millett | 379/88 |
| 4,817,127 | 3/1989 | Chamberlin et al. | 379/67 |
| 4,881,259 | 11/1989 | Scordato. | |
| 4,951,307 | 8/1990 | Willard | 379/74 |

FOREIGN PATENT DOCUMENTS 0004150  1/1989  Japan ................................ 379/77

Primary Examiner—Jin F. Ng
Assistant Examiner—Huyen D. Le
Attorney, Agent, or Firm—Edward B. Anderson

[57] ABSTRACT

A telephone answering machine for receiving and recording calls received over telephone lines includes one of a plurality of interchangeable base units having different functions and features, one of a plurality of interchangeable user-interface units also having different functions and features, and a system for communicating between the units. Each base unit includes a telephone line interface circuit, a player/recorder and a first controller, responsive to commands for operating the base unit devices. Each installed user-interface unit is remote from an associated installed base unit and includes user-operable key means for inputting command signals related to the recording and playing back of messages. It also includes a speaker, a microphone, a display for visually displaying information, and a second controller for controlling operation of the keys, speaker, and display. The communication system uses a standard interface for coupling any base unit to any user-interface unit.

5 Claims, 3 Drawing Sheets

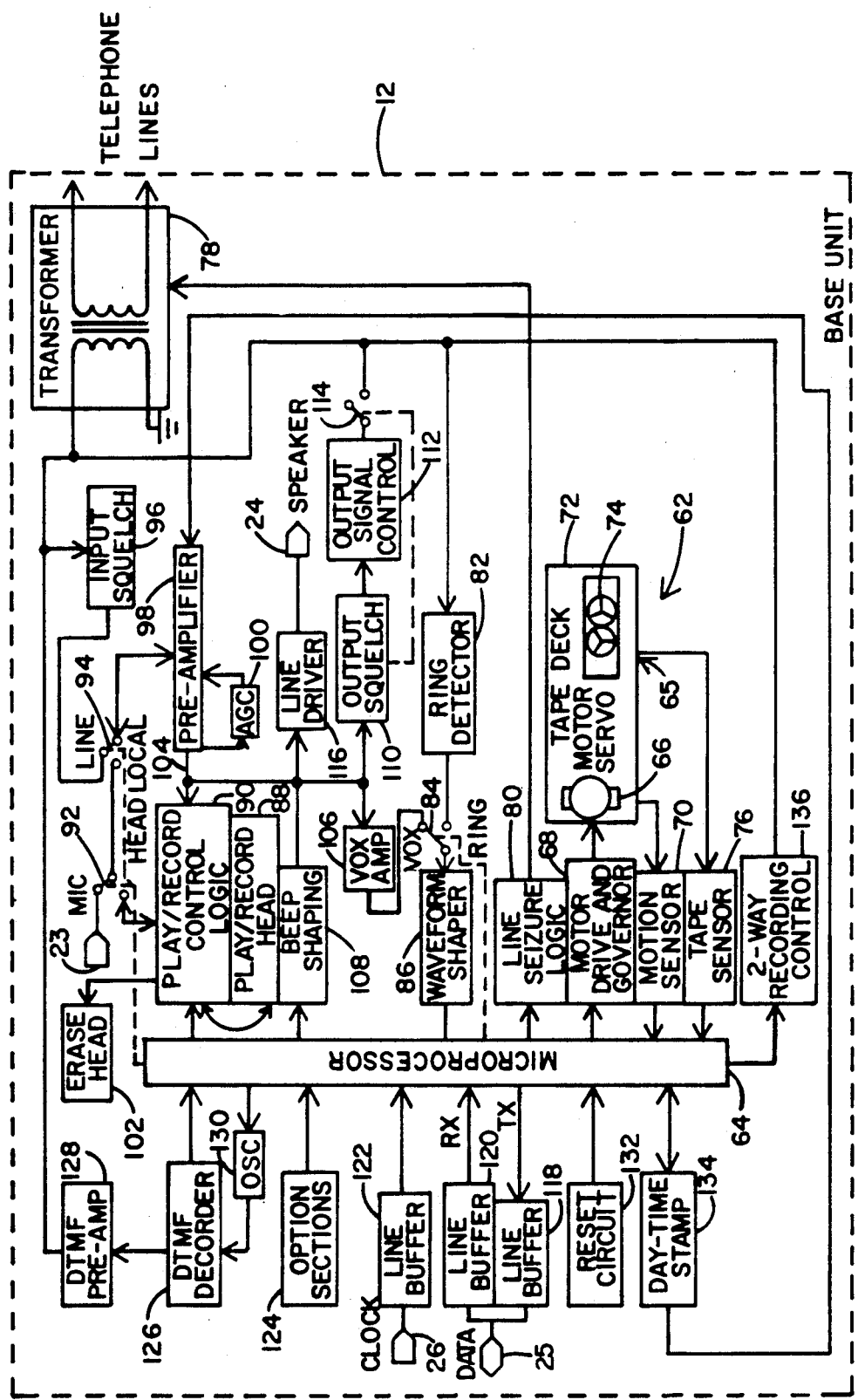

MODULAR TELEPHONE ANSWERING MACHINE

FIELD OF THE INVENTION

This invention relates to telephone answering machines, and particularly to answering machines constructed of a base unit housing a recorder/playback device and a separate user-interface unit having user input/output devices.

BACKGROUND AND SUMMARY OF THE INVENTION

Telephone answering machines perform the basic function that they automatically answer calls incoming on a telephone line if it is not answered first, play a prerecorded outgoing message to the calling party, and then record any message the calling party leaves. Besides this main function, many other features and functions are available currently. For instance, a time and-/or date "stamp" is recorded at the end of a received message to indicate when the message was received during later playback. The machine can be set to announce only, or allow a specified time or unlimited time (voice operated) for recording of incoming messages.

Further, the hardware can vary on the machines. A single-tape player, a double-tape player, or even a digital memory with voice synthesizer may be used to announce and record. Visual displays may include individual LED lights and seven-segment LED or LCD digit displays of different numbers of characters. These displays are used to display the status and operating mode of the machine, the number of incoming calls, the time and date, and other relevant information.

The telephone line interface transformer and usual tape player tend to make answering machines bigger than telephone handset stations, and the operation of the one or two tape players can be noisy. It is therefore desirable to have a telephone answering machine that provides for use of all the functions of conventional machines, but without the size and noise limitations.

The present invention provides these features in a system for configuring a telephone answering machine that has the user interface features in one of a plurality of interchangeable panel or user-interface units and the other devices housed in one of a plurality of interchangeable remote base units. The various base units and the various panel units, respectively, may be capable of performing different functions. The base unit preferably contains the telephone line interface transformer, power supply, message recorder/player, option selections, and master controller. This unit may be placed in an inconspicuous place or may be hidden, so that the size and noise from operation of the unit, are not significant. The user-interface unit simply contains those features required for a user to operate the answering machine. Thus, it may include such things as microphone, speaker, input buttons (keys), and visual display.

Generally speaking, the present invention is directed to a telephone answering machine for receiving and recording calls received over telephone lines comprising a base unit, a user-interface unit, and means for communicating between the units. More particularly, the base unit includes a telephone line interface circuit connectable with the telephone lines for receiving and transmitting messages. A recorder is responsive to a control signal for recording messages received on the telephone lines or from a microphone in the user-interface unit. A speaker signal is generated by playing back these recorded messages. A controller controls operation of the telephone line interface circuit and the recorder based on commands input into the user-interface unit by a user.

The user-interface unit is remote from the base unit and includes user-operable keys or buttons for inserting command signals related to the recording and playing back of messages. A speaker is responsive to a speaker audio signal for producing sounds representative of the speaker audio signal. A microphone is responsive to user-generated sounds for producing a microphone audio signal representative of the user-generated sounds for use in recording announcements.

A communication link provides a transmission path that couples the base unit and the user-interface unit for communicating the various command and audio signals.

Further, the present invention preferably includes a method of communicating between the base and user-interface units whereby commands are sent between the two units. The commands relate to functions that the receiving unit may be able to perform. If the command corresponds to a function the receiving unit can perform, the function is performed. If the command does not correspond to a function the receiving unit can perform, the receiving unit does not respond to the command.

This method allows different base units and different user-interface units to be used interchangeably. Thus, a user-interface unit having very limited display and keyboard features can be used with a base unit having full function capabilities. Then, the user-interface unit can be replaced with a full-feature unit, which then functions completely with the same base unit. There is thus a modularity and replacement capability built into the system, so that a user can use less expensive or reduced-feature units initially, and upgrade to more functionality later.

These and other features and advantages of the present invention will be apparent from the following detailed description of the preferred embodiment and associated drawings.

BRIEF DESCRIPTION OF THE DRAWINGS

FIG. 6 is a block diagram of an exemplary base unit included in of FIG. 1.

FIGS. 7 and 8 are timing diagrams showing data transmission by the base unit and the user-interface unit, respectively.

DETAILED DESCRIPTION OF THE PREFERRED EMBODIMENT

Figure 1:
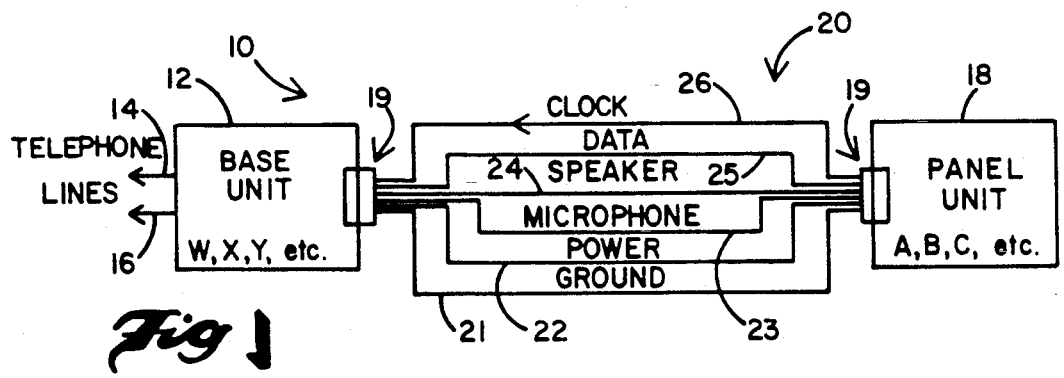
FIG. 1 is a block diagram of an answering machine made according to the invention.

Referring initially to FIG. 1, an answering machine 10, made according to the invention, is shown. Machine 10 includes a base unit 12, connectable to external telephone lines 14 and 16, and a user-interface unit 18. The two units are coupled together by a communication system, shown generally at 20.

The communication system may be of any form, such as infrared, radio frequency, optical or hardwired. In order to provide a simplified system that is familiar to customers, the preferred embodiment is a 6-wire cord, such as a telephone-type of cord, with standard modular plugs on each end. This allows the user to insert any length cord desired, and allows the base and panel units to be readily interchanged, as is described below.

Communication system 20, in this embodiment, includes a ground line 21, a power line 22, a microphone line 23, a speaker line 24, a data line 25, and a clock line 26. The power lines provide power from the base unit to the user-interface unit. The base unit preferably includes an internal transformer and regulator (not shown) to convert conventional alternating current power into direct current power for use by the base and user-interface units.

The interface unit provides a synchronizing clock for both units. With a single data line, use of the line must be shared to provide for communication in both directions. Thus, each unit has a transmit (TX) line and receive (RX) line connected to the data line, as shown.

As will be seen, a communication protocol is used that allows panel units and base units with different features to be used, or for units with different devices for accomplishing the same function. For example, the following different units could be used.

---

Interface Units
    Type A
        Display: Individual LEDs
        Function Keys: Stop/Save
                Play/Rewind
                Memo/Fast Forward
                Outgoing Message (OGM)/Check
        Selection Switch: Answer Normal/Answer Only
    Type B
        Display: Two 7-segment LEDs
        Function Keys: same as Type A
        Selection Switch: Answer Normal/Answer Only
    Type C
        Display: Four-Digit LCD
        Function Keys: Stop/Save
                Play/Rew
                Memo/FF
                OGM Rec/Check
                2-Way Rec
                Set
                Alarm
                Time
                Hour
                Minute
                Week Day
        Selection Switch: Answer Normal/Answer Only
Base Units
    Type W
        Single-Tape Recorder/Playback Unit
    Type X
        Double-Tape Recorder/Playback Unit
        Time Stamp
    Type Y
        Single-Tape for recording messages
        Digital memory for announcement
        Time Stamp
    Type Z
        All-digital recording and playback
        Time Stamp

---

Thus, it can be seen that many possible combinations of units are available. A single base unit can be used initially with a more basic user-interface unit, such as Type A. Later, the answering machine can be upgraded by replacing the user-interface unit with one with more features, such as a Type C unit.

Figure 2:
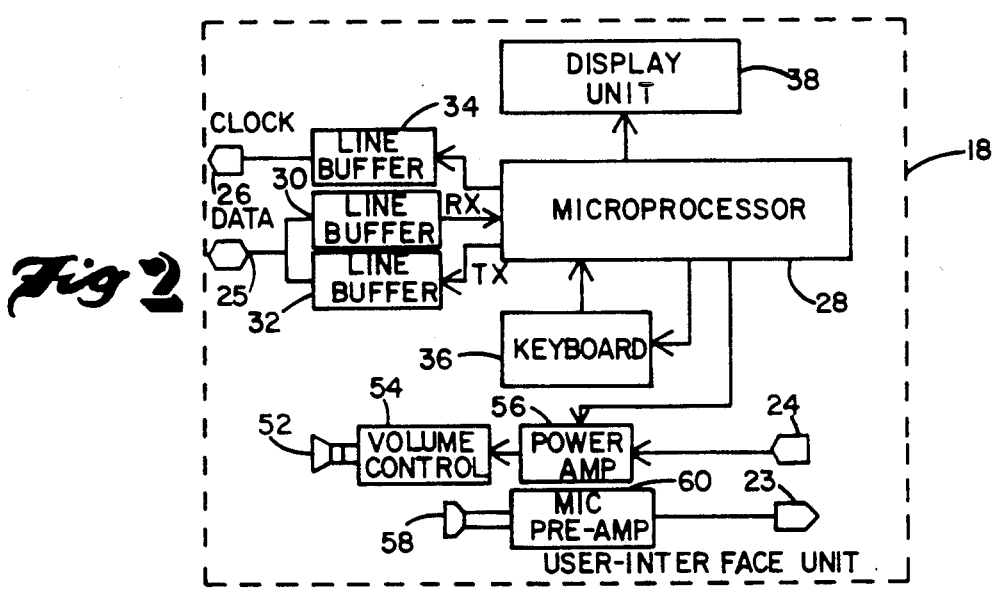
FIG. 2 is a block diagram of an exemplary userinterface interface unit included in the machine of FIG. 1.

Referring now to FIG. 2, a generic user-interface unit 18 is shown. The circuitry used in this unit and the base unit are generally known, and therefore will not be described in specific detail, other than as specified. This unit includes a microprocessor 28 that receives data on communication system 20 from the base unit via a line buffer 30 and transmits data via a line buffer 32. The connection of these communication lines is to the plug connector 19, not shown. Microprocessor 28 has an internal clock that transmits a clock signal to the base unit via a line buffer 34, for synchronizing the two units, and as will be seen, for use in coordinating the transmission of data.

A keyboard 36, which may have any form and arrangement of input keys, depending on the features of the unit, is controlled and scanned by the microprocessor. A display unit 38 provides status and other information to the user, again depending on the display selected.

Figure 3:
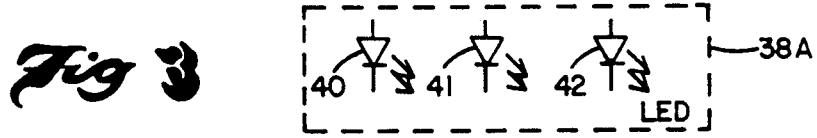
FIGS. 3-5 show alternative displays usable in the user-interface unit of FIG. 2.

For instance, FIG. 3 shows the use of three individual LEDs 40, 41 and 42 in a display 38A that are used in the Type A unit. These LEDs are used to show Answer Ready, Recording, and Messages. The Messages LED shows the number of messages received by flashing the LED a corresponding number of times, followed by a long pause. If more than nine messages have been received, the Message LED flashes continuously. The Answer LED is turned on to indicate that the answering machine is ready to answer incoming calls. The recording LED indicates the readiness of the machine for recording an outgoing message or memo.

Figure 4:
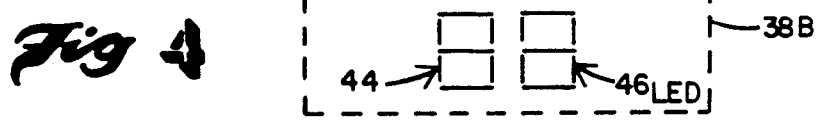

FIG. 4 shows a display 38B that is provided with the Type B interface unit. It includes two seven-segment LED or LCD digits 44 and 46. These digits show the actual number of messages received as well as the time remaining during the recording of an outgoing message. The number of control lines required to operate the digits can be reduced from the 14 direct-drive lines to 9 lines by using a scanning method. One digit is driven at a time, so that the digits are activated alternately.

Figure 5:
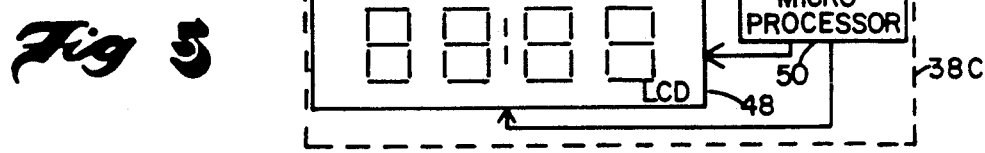
Figure 2:
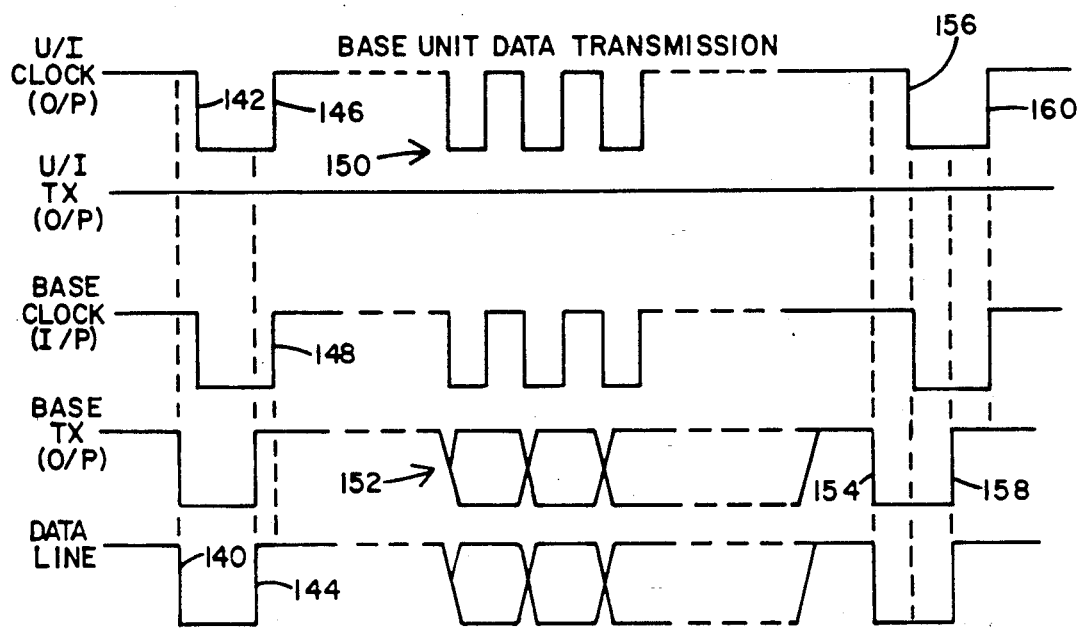
Figure 3:
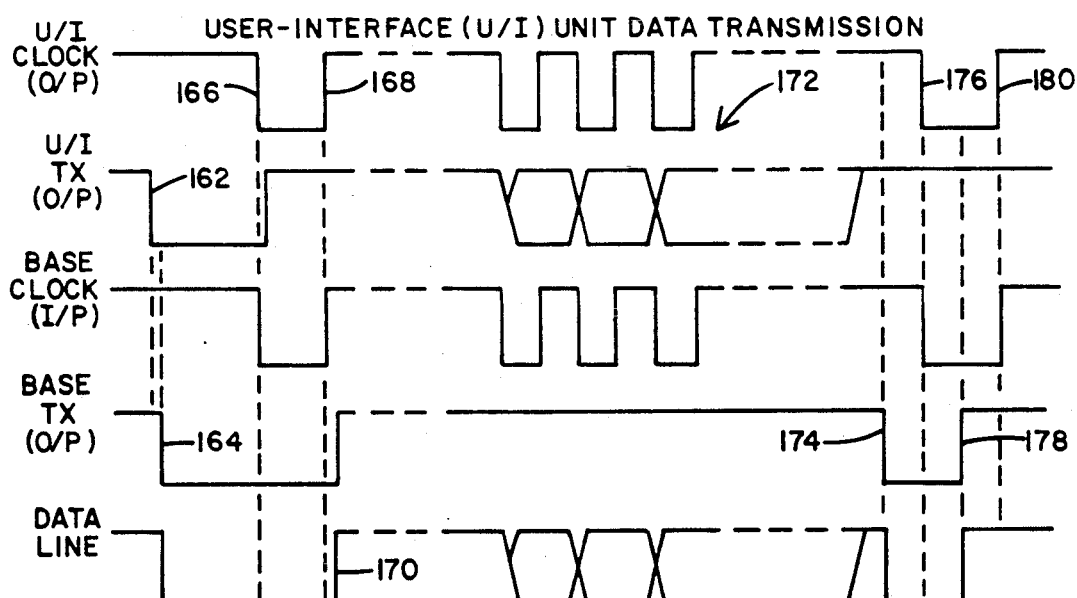

FIG. 5 shows a more elaborate display 38C that is used in the Type C user-interface unit. This display includes a four-digit time LCD or LED circuit 48 with an associated dedicated LCD or LED digit-driving microprocessor 50 for driving respective segment and column drivers, as is conventionally provided. Microprocessor 28 thus provides the digital information and minimal control of the actual display.

A speaker 52, built into the user-interface unit housing (not shown), is manually controlled by a volume control 54 that feeds the speaker audio signal to a power amp 56, controlled by microprocessor 28, after transmission from the base unit over line 24.

A microphone 58 generates a microphone audio signal that passes through a pre-amp circuit 60 for amplification prior to transmission to the base unit via line 23.

It can be seen that the user-interface unit contains only enough devices to give the user all of the interface functions normally included in a single-unit answering machine without any of the equipment that makes it function. These are provided in the base unit.

FIG. 6 shows a block diagram of a base unit 12 similar to Type W having only a single-tape message recording device 62. A master microprocessor 64 drives a tape player/recorder 65, including a tape drive motor 66 via a motor driver and governor circuit 68. Circuit 68 provides the power needed to drive the motor. The motor motion is detected by a motion sensor circuit 70 that receives input from an encoder (not shown) mounted to sense rotation of a tape cassette positioned in tape deck 72 by a photoreflective plate mounted on a tape take-up wheel 74. Rotation of the take-up wheel is used to determine the length of tape passing onto the take-up wheel by the microprocessor. A tape sensor switch 76 is mounted under the tape deck to sense when a cassette is placed in the tape deck 72. Operation is prevented if a tape is not inserted in the deck.

A telephone interface transformer 78 is connectable to the external telephone lines 14 and 16. The transformer is controlled by a signal from a line seizure logic circuit 80, enabled by microprocessor 64.

The telephone line from transformer 78 is connected to a ring detector circuit 82. A detected ring is fed through an analog switch 84 that is switched to connect the detector circuit to a waveform shaper circuit 86 when the machine is set to receive incoming calls. The waveform shaper circuit converts the ring into a rectangular waveshape sensed by the microprocessor. When a selected number of bursts of rings, such as two or four as selected by the user, the microprocessor turns on line seizure logic circuit 80 to seize the line for call answering.

The telephone line is also coupled to the play/record head 88 of the tape player/recorder 65 via a play/record control logic circuit 90. A line/local switch 94, and an input squelch circuit 96 that cuts out background noise, connects the telephone line to a pre-amplifier 98. Within the pre-amplifier it also passes through an automatic gain control circuit 100 prior to being input into play/record control logic circuit 90.

The microphone audio signal on line 23 is input by a mic/head switch 92 and then it passes through switch 94 to pre-amplifier 98. During all recordings, a tape erase head 102 is concurrently activated to erase any message previously on the tape.

The output of pre-amplifier 98 is also connected to a voice amplifier circuit 106 that is used to input voice audio signals into the microprocessor via switch 84 and shaper circuit 86.

A beep shaping circuit 108 is also connected between the microprocessor and conductor 104. This circuit reshapes a tone signal from the microprocessor by removing undesired frequency components. The shaped signal is then fed over conductor 104 to an output squelch circuit 110. Circuit 110 is arranged to monitor the output signals. Signals below specification, such as background noise, are blocked. Sufficiently strong signals are output onto the telephone line through an output signal control circuit 112 and analog output line switch 114, controlled by squelch circuit 110.

A recorded message is fed to speaker 52 in userinterface unit 18 for monitoring by a user via a line driver circuit 116 that connects conductor 104 to speaker audio line 24.

Data is transmitted and received through respective line buffer circuits 118 and 120, connected to data line 25. The clock signal on line 26 is received through a line buffer circuit 122. Any of several function options are selected by a user operating a switch in a bank 124 of selection switches. These switches insert or remove diodes from sense lines that indicate to the microprocessor what selections are made.

Various remote control functions are available when a user calls the answering machine from a remote dual-tone, multifrequency (DTMF) telephone. A DTMF decoder 126 senses and decodes the user's remote command after it has been amplified and filtered by a DTMF pre-amplifier 128. The decoder feeds a binary code corresponding to the user's command to the microprocessor. A microprocessor-controlled oscillator 130 inputs a synchronizing signal into the decoder.

A resistor-capacitor reset circuit 132 is used to reset the microprocessor at initial power up of the answering machine. The microprocessor then performs an initialization procedure to make the system ready to operate.

A day-time stamp circuit 134, if included in the unit, provides prerecorded synthesized speech of the day and time. When an incoming message is recorded, the microprocessor accesses circuit 134 to provide a voice recording of the day and time at the end of the message. The microprocessor sends the phrase codes to circuit 134 which then generates the speech signal and passes it to voice pre-amplifier 98. It is then recorded on the tape as in a normal recording mode.

A 2-way recording control circuit 136 connects microprocessor 64 to the telephone line. During recording of two-way telephone conversations, the telephone line is not seized by use of the seizure logic circuit 80. Rather, the 2-way control logic is enabled to get the two-way signal transmitted via telephone interface transformer 78 into pre-amplifier 98, as in normal recording. There is no voice checking by output squelch circuit 110 during two-way recording.

During recording with a microphone, the audio line from the microphone is routed to the tape head via pre-amplifier 98. When the recording is terminated, the microprocessor changes switch 92 to the head position to block the microphone input. Record head 88 is isolated from preamplifier 98 by control of logic circuit 90. A waiting tone is applied via shaping circuit 108 to indicate that the recording is finished.

Also during recording, the microprocessor checks to see whether a voice is present in the signal path. This is done by feeding the signal output from pre-amplifier 98 through voice amplifier 106 and shaper circuit 86 to the microprocessor. The tape motion is also monitored to determine the length of tape used to record the message.

When a playback command is received by the microprocessor, it enables the playback circuit in the play/record control circuit 90 and sets switch 92 to the head position and switch 94 to the local position. The speaker audio signal then passes through pre-amplifier 98 and out to the speaker via line driver 116. Signal monitoring is provided by also feeding the signal through the voice amplifier and waveform shaper to the microprocessor.

When a call comes in, line seizure logic circuit 80 is enabled to seize the line, passing the signal through transformer 78. Switch 94 is set in the local position and switch 114 is closed to allow the announcement to be transmitted out the telephone line. The signal is also fed through line driver 116 for monitoring on the speaker.

The beep tone signal is generated by the microprocessor through the beep shaper 108 and also output on the telephone line at the end of the announcement.

During recording of the incoming message, the microprocessor switches the play/record control circuit into a recording mode. Switch 94 is set in the line position and the message is input via pre-amplifier 98. During recording, the microprocessor monitors the signal to see if it is a voice signal by routing through amplifier 106 and waveform shaper 86.

The following shows command codes, also referred to as function signals, for different base and user-interface units.

| USER-INTERFACE TO BASE | (MEANS) | USER-INTERFACE UNIT TYPE | | |
|---|---|---|---|---|
| | | A | B | C |
| Bit 7 6 5 4 3 2 1 0 | | | | |
| 0 0 0 0 0 0 0 0 | Out Going Message (OGM) Play | X | X | X |
| 1 0 0 0 0 0 0 1 | Incoming Message (MSG) Play | X | X | X |
| 1 0 0 0 0 0 1 0 | OGM Recording | X | X | X |
| 0 0 0 0 0 0 1 1 | Memo Recording | X | X | X |
| 1 0 0 0 0 1 0 0 | Fast Forward | X | X | X |
| 0 0 0 0 0 1 0 1 | Rewind | X | X | X |
| 0 0 0 0 0 1 1 0 | Answer Only | X | X | X |
| 1 0 0 0 0 1 1 1 | Answer Rec | | X | X |
| 1 0 0 0 1 0 0 0 | Answer Ready | | X | X |
| 0 0 0 0 1 0 0 1 | Save | X | X | X |
| 0 0 0 0 1 0 1 0 | On-Hook | | | X |
| 1 0 0 0 1 0 1 1 | Two Way Recording | | | X |
| 0 0 0 0 1 1 0 0 | Day Time Stamp Set | | X | X |
| 1 0 0 0 1 1 0 1 | Day Time Stamp Check | | X | X |
| 1 0 0 0 1 1 1 0 | | | | |
| 0 0 0 0 1 1 1 1 | Key Release | | X | X |

| BASE TO USER-INTERFACE | (MEANS) | BASE UNIT TYPE | | |
|---|---|---|---|---|
| | | W | X | Y |
| Bit 7 6 5 4 3 2 1 0 | | | | |
| 0 0 0 0 0 0 0 0 | Motor (Stop) | X | X | X |
| 1 0 0 0 0 0 0 1 | Motor (MSG Record/Play) | X | X | X |
| 1 0 0 0 0 0 1 0 | Motor (OGM Play) | X | X | X |
| 0 0 0 0 0 0 1 1 | Motor (OGM/Memo Record) | X | X | X |
| 1 0 0 0 0 1 0 0 | Motor (MSG Record/Play) | X | X | X |
| 0 0 0 0 0 1 0 1 | Motor (Forward Winding) | X | X | X |
| 0 0 0 0 0 1 1 0 | Motor (Reverse Winding) | X | X | X |
| 1 0 0 0 0 1 1 1 | Home Mode | | X | X |
| 1 0 0 0 1 0 0 0 | Ready Mode | | X | X |
| 0 0 0 0 1 0 0 1 | Full Tape (Memory) | | X | X |
| 0 0 0 0 1 0 1 0 | Display Last 10S | | | X |
| 1 0 0 0 1 0 1 1 | No of MSG | X | X | X |
| 0 0 0 0 1 1 0 0 | Disable/Enable Key Scan | X | X | X |
| 1 0 0 0 1 1 0 1 | Time Request | | X | X |
| 1 0 0 0 1 1 1 0 | Scan Answer, On Hook Key Only | | | X |
| 0 0 0 0 1 1 1 1 | No Tape Condition | | | X |

These codes are transmitted between the two units by communication system 20. If a receiving unit does not perform the requested function, the command is simply ignored. Thus, no response is sent back to the transmitting unit and no action takes place, or a default action is performed.

FIGS. 7 and 8 illustrate the protocol for requesting use of the data line and transmission of a command on the line. FIG. 7 in particular shows the procedure for transmission of a command by the base unit. The clock line provides a synchronizing clock from the user-interface (U/I) unit to the base unit during transmission of the data on the data line.

Since only one data line is used for both units, the priority of using the data line is through a data line request sequence. FIG. 7 shows the timing sequence of signals in which a data line request is made by the base unit microprocessor. When neither unit has a command to send, the clock line and data lines are held in a high (idle) state, as shown at the left edges of the signals.

The base unit checks both the clock line and the data line to see that they are high. It then puts a low signal on the base TX line, which pulls the data line low, as shown at 140. The base unit holds the data line low for a predetermined period, such as 500 microseconds, during which it looks to see if the clock level lowers. When the U/I unit sees the data line go low, it lowers the state of the clock line at 142 to confirm to the base unit that it is ready to receive data.

When the base unit detects the low state of the clock line, it changes the data line to a high state at 144 and waits for a high in the clock line. When the U/I unit sees the data line go high, it responds by raising the state of the clock line, as shown at 146, thereby releasing the data line to the base unit. The U/I unit then begins a clock pulse train 150 after a brief delay. When the base unit sees the high clock state at 148 and the clock train, it sends data, as shown at 152, to the U/I unit.

After the end of the transmission, the base unit sets the data line to a low logic level at 154. The U/I microprocessor does a parity check on the data received. If a correct parity exists, the clock level is lowered at 156 to confirm it. If the base unit does not see the lowering of the clock signal within a predetermined time period after lowering the data line, an error is considered to have existed in the transmission and a retransmission is requested. The base unit finally raises the data line at 158 after the predetermined time period, and the U/I unit then raises the clock line level at 160 to wait for the next transmission request.

FIG. 8 illustrates transmission of data from the userinterface (U/I) unit. Again, after verifying that the data line is in the idle (high) state, the data line state is lowered by sending a low output on the U/I TX line at 162. This "request" is acknowledged by the base unit sending a corresponding low signal on the data line at 164.

After a predetermined time after lowering the state of the data line, the U/I unit lowers the clock line at 166 for at least a predetermined period of time. During this time period, the U/I unit sees that the base unit has lowered the data line state, and responds by raising the state of the clock line at 168. The base unit responds to the high clock line state by raising the state of the data line at 170 by a corresponding raise in the state of the Base unit TX line, as shown. This confirms to the U/I unit that the base unit is ready to receive data. That is, the base unit has released control of the data line.

After a slight delay, the clock pulses and synchronized data transmission begins, as shown generally at 172. After completion of transmission of the data the U/I unit puts the clock and TX lines in a high state, waiting confirmation of a valid transmission from the base unit. This confirmation occurs when the base unit lowers the state of the base unit TX line at 174, thereby lowering the state of the data line.

The U/I unit in turn responds by lowering the state of the clock line at 176 within a predetermined time from when the base unit lowered the state of the data line. If there is no confirmation in the olock line, or if the base unit does not confirm a valid transmission, a retransmission request is made. If a valid transmission occurred, as shown in FIG. 8, the base unit raises the data line state at 178, followed by the U/I unit raising the clock line state at 180, returning the communication system to the idle state.

It is thus seen that the present invention provides an answering machine in which user-interface devices are constructed as one unit and the supporting recording and control devices are constructed as a separate base unit. Communication between the two units provides for full answering machine functions while allowing interchangeability of units. A special communication protocol system allows a single standard telephone-type 6-wire cord to be used for communication between the units, although other forms of communication may be used The present invention thus provides a device that permits limiting the unit actually used by a user to user input-output devices. This substantially limits the size and complexity of the user-interface unit, making it more desirable to put in a readily accessible position. The base unit can then be placed in an inconspicuous location.

Thus, while the invention has been described with reference to a preferred embodiment, this is intended only for purposes of illustration. Variations in the detail and form of the preferred embodiment may be made without varying from the spirit and scope of the invention as defined in the claims.

I claim:

1. A modular telephone answering machine for receiving and recording calls received over telephone lines comprising:
    a base unit including:
        a telephone line interface circuit connectable with the telephone lines controllable for receiving and transmitting audio signals;
        recorder means controllable for recording and playing back audio signals;
        base controller means, responsive to command signals and coupled to the telephone line interface circuit and the recorder means, for performing the functions of controlling the telephone line interface circuit for receiving an incoming call and associated telephone audio signal, controlling the recorder means for recording audio signals, including audio signals received as an incoming call message or a microphone audio signal, and generating a speaker audio signal by playing back recorded audio signals; the base controller means also generating a status signal representative of the functioning of the recorder means; and
        base communication means coupled to the telephone line interface circuit, the recorder means, and the base controller means for outputting a speaker audio signal, and for inputting command signals and microphone audio signals;
    a user-interface unit remote from the base unit and including:
        user-operable key means for inputting command signals related to the base unit functions of recording and playing back of messages;
        speaker means responsive to a speaker audio signal for producing sounds representative of the speaker audio signal;
        microphone means for producign a microphone audio signal representative of user-generated sounds;
        user-interface communication means coupled to the key means, spekaer means, and microphone means for outputting the command signals and a microphone audio signal, and inputting a speaker audio signal;
    display means responsive to a display control signal for visually displaying to the user information representative of the display control signal; and
    user-interface controller means coupled to the key means, the display means and the user-interface communication means, and being responsive to a status signal for generating a display signal representative of the status signal; and
    means for coupling the base unit with the user-interface unit for transmitting the command and microphone audio signals from the user-interface communication means to the base communication means, transmitting the speaker audio signal from the base communication means to the user-interface communication means, and transmitting the status signal from the base communication means to the user-interface communication means; and
    the base means transmits the status signal and receives the command signal, and the user-interface communication means receives the status signal and transmits the command signal over a single communication channel, the base means and the user-interface controller means each further generates a request signal for notifying the controller means not generating a request signal that it has a respective one of a command signal and a status signal to send, prior to sending the respective one of the command signal and the status signal.

2. A machine according to claim 1 wherein the base controller means and the user-interface controller means, when respectively notified that the controller means generating a request signal has a signal to send, notifies the controller means generating a request signal that it is ready to receive the signal.

3. A machine according to claim 2 wherein the one of the base controller means and the user-interface controller means having a respective one of a command signal and a status signal to send, only sends the respective one of a command signal and a status signal if notification is received from the controller means not generating a request signal that it is ready to receive the signal.

4. A telephone answering machine for receiving and recording calls received over telephone lines comprising:

a base unit including:

a telephone line interface circuit connectable with the telephone lines and controllable for receiving and transmitting audio signals;

recorder means controllable for recording audio signals received on the telephone lines and playing back the recorded audio signals; and base controller means, responsive to base command signals representative of a predetermined set of functions of the base unit, a microphone audio signal, and coupled to the telephone line interface circuit and the recorder means, for controlling the telephone line interface circuit for receiving an incoming call, for controlling the recorder means for recording audio signals, including audio signals received as an incoming call and microphone audio signals, for generating speaker audio signals by playing back recorded audio signals, and for generating a userinterface command signals representative of functions of a coupled user-interface unit display means; and base communication means coupled to the telephone line interface circuit, the recorder means, and the base controller means for outputting a speaker audio signal, outputting the user-interface command signal on a single communication channel, inputting base command signals on the single communication channel, and inputting the microphone audio signals;

a user-interface unit remote from the base unit and including:

user-operable key means for inputting user-input command signals representative of a function of the base unit;

speaker means responsive to speaker audio signals for producing sounds representative of the speaker audio signals;

microphone means responsive to user-generated sounds for producing a microphone audio signal representative of the user-generated sounds;

display means responsive to a display signal for performing a display function representative of the display signal;

user-interface controller means coupled to the key means, the display means and the communication means, for generating base command signals representative of the user-input command signals, and being responsive to the user-interface command signals for generating the display signal to be representative of the user-interface command signal; and user-interface communication means coupled to the key means, speaker means, microphone means, and user-interface controller means for outputting the base command signals over the single communication channel, outputting the microphone audio signals, inputting the speaker audio signals, and inputting the user-interface command signals over the single communication channel; and means for coupling the base unit with the user-interface unit for communicating the command and microphone audio signals from the user-interface communication means to the base communication means, and transmitting the speaker audio and status signals from the base communication means to the user-interface communication means;

the base and user-interface controller means each further generating a request signal for notifying the other controller means that it has a signal to send, prior to sending the signal; and the recorder means further being capable of performing a predetermined set of functions, the base controller means only responding to signals representative of the functions included in the respective predetermined plurality of associated functions.

5. A method of communicating in a telephone answering machine between one of a plurality of base units, each including a telephone line interface and a player/recorder and being responsive to command signals corresponding to the functions of recording an incoming call message or a microhpone audio signal and playing back a recorded incoming call message or a microhpone audio signal, different base units being capable of performing different functions, and one of a plurality of user-interface units remote from the one base unit, the user-interface unit including a display and a key input means for inputting command signals, comprising the steps of:

transmitting from each of the base and user-interface units a signal on a single data channel that the respective base unit and interface unit is available for receiving a command signal;

generating a command signal in the user-interface unit, the command signal corresponding to a function of a base unit;

transmitting on the data channel a request signal from the user-interface unit notifying the base unit that the user-interface unit has a command signal to transmit;

transmitting on the data channel a release signal from the base unit notifying the user-interface unit that the base unit is ready to receive the command signal;

transmitting on the data channel the generated command signal from the user-interface unit to the base unit;

determining if the command signal corresponds to a function of the base unit;

ignoring the transmitted command signal if the command signal does not correspond to a function of the base unit; and performing the function corresponding to the command signal if the command signal does correspond to a function of the base unit.

* * * * *